United States Patent [19]

Wachter

[11] Patent Number: 5,539,789
[45] Date of Patent: Jul. 23, 1996

[54] METHOD AND APPARATUS FOR IDENTIFYING FAILED NUCLEAR FUEL RODS DURING REFUELING IN A REACTOR CORE

[76] Inventor: William J. Wachter, 411 English Rd., Wexford, Pa. 15090

[21] Appl. No.: 388,477

[22] Filed: Feb. 14, 1995

[51] Int. Cl.⁶ .......................... G21C 19/10; G21C 17/06
[52] U.S. Cl. .......................... 376/252; 376/264; 376/271
[58] Field of Search .................................. 376/251, 252, 376/259, 264, 268, 271

[56] References Cited

U.S. PATENT DOCUMENTS 4,039,376  8/1977  Wachter .................................. 376/252
4,482,520  11/1984  Randazza ................................ 376/271
4,539,174  9/1985  Patenaude ............................... 376/271

Primary Examiner—Daniel D. Wasil
Attorney, Agent, or Firm—Clifford A. Poff

[57] ABSTRACT

An accelerometer is mounted onto the releasable fuel gripper structure of a refueling machine to form a mechanical interconnection between an accelerometer and a nuclear fuel assembly during removal from a core of a nuclear reactor. An electrical signal is received and processed through an analyzer and recorded corresponding to mechanical vibrations occurring due to the passage of a fluid medium through a porous sidewall defect in a fuel rod of the fuel assembly which is induced by a hydrostatic pressure change on the fuel assembly during upward movement from the reactor core.

15 Claims, 5 Drawing Sheets

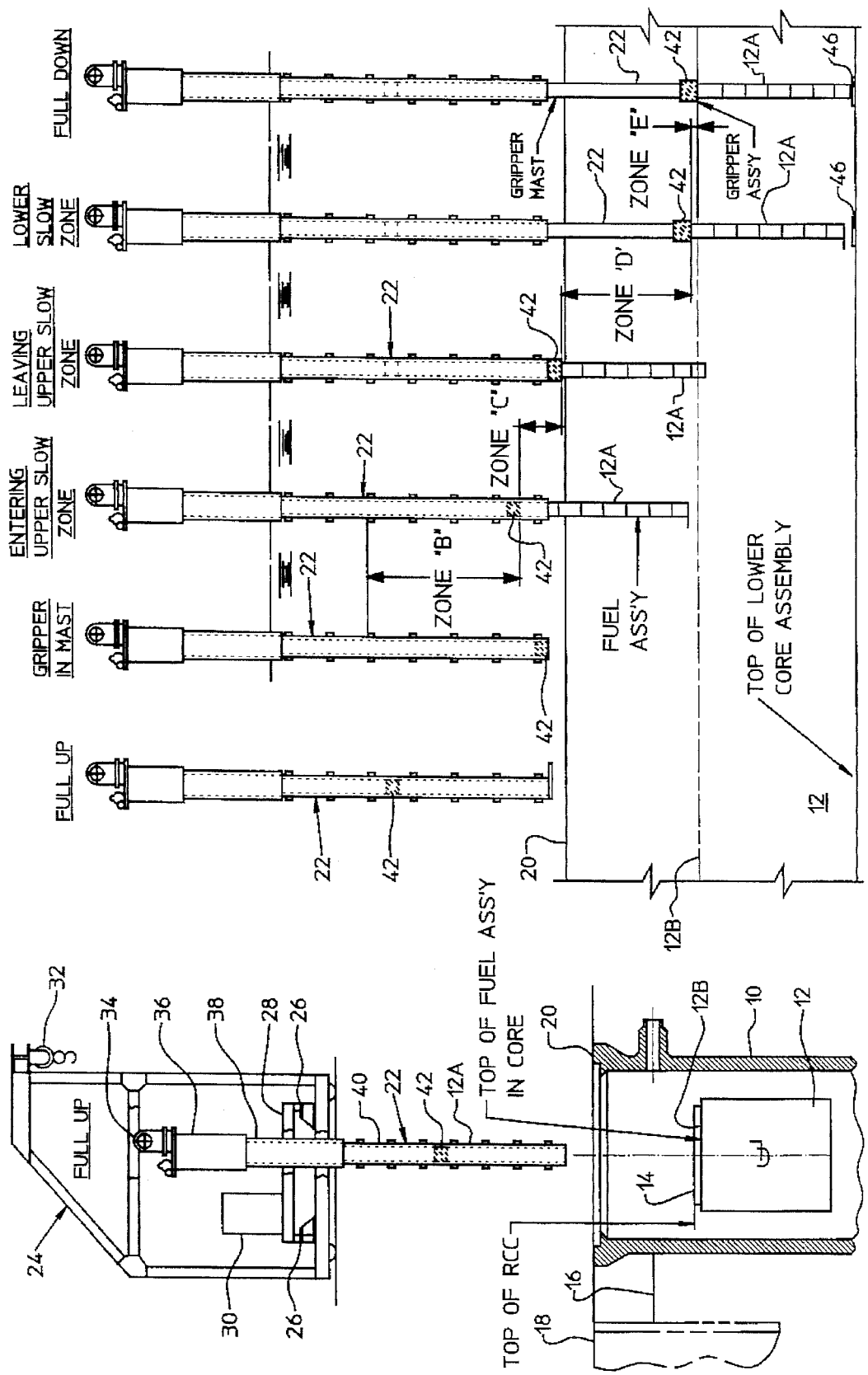

METHOD AND APPARATUS FOR IDENTIFYING FAILED NUCLEAR FUEL RODS DURING REFUELING IN A REACTOR CORE

BACKGROUND OF THE INVENTION

1. Field of the Invention

The present invention relates to a fuel assembly acoustic system tester for identifying leaking nuclear fuel assemblies, and, more particularly, to a system responsive to vibrations emitted from a leaking fuel assembly during removal from a nuclear reactor core such as during refueling of the nuclear reactor.

2. Description of the Prior Art

As disclosed in my U.S. Pat. No. 4,039,376, it is known in the art to inspect nuclear fuel rods and assemblies of fuel rods to detect and locate defective rods. As explained in the patent, the large nuclear reactors utilized for power generation consist of an array of a large number of fuel rods containing nuclear fuel. Each rod comprises a metal tube which may be from 8 to 15 feet long and approximately ½ inch in diameter, and which contains a stack of cylindrical fuel pellets of suitable fissionable material such as uranium oxide. The upper end of the tube is empty of fuel pellets and forms a plenum for a gas or other fluid under substantial pressure which fills the top of the rod and also the small clearance space which is provided around the pellets to allow for expansion or swelling. The fuel rods are supported in parallel groups as fuel assemblies which may typically contain from 49 to as many as 300 fuel rods, and the complete nuclear reactor is made up of a large number of these fuel assemblies arranged in a suitable configuration.

The metal tubes of the fuel rods constitute the primary containment boundary for the radioactive nuclear fuel, and inspection to verify the integrity of the rods is of primary importance. In the manufacture of the fuel rods, the tubing itself and the end cap welds are carefully inspected and helium leak tests of the completed rods are also performed. Since a nuclear reactor may contain as many as 40,000 fuel rods, however, it will be apparent that a significant probability exists that some number of defective tubes will be present even with a highly effective manufacturing quality control program. Furthermore, even initially good fuel rods may develop cracks, pinholes or other defects in service and such defective rods must be detected.

The reactor is usually shut down about once a year for refueling and at this time, as well as during initial installation, the fuel rods must be inspected to detect any defective rods that may be leaking fission products. The reactor and the fuel assemblies are immersed in a pool of water during the refueling operations and during removal of the fuel assemblies for replacement or inspection. In the standard method of inspection which has been used heretofore, the flow of water through each fuel assembly to be inspected is blocked so as to allow the fuel rods to heat up, which causes expulsion of fission products into the water through any defect that may exist in the rods. The water is then checked to detect the presence of radioactivity in the water, indicating that such leakage of fission products has occurred and that a defective rod is present in the assembly being tested. This system requires that the water be pumped to a sampling station and repeatedly analyzed or checked for radioactivity and is a very slow procedure requiring as much as an hour for each fuel assembly. Complete inspection of all fuel rods in a large power reactor is, therefore, very consuming and may require as much as a week during which the reactor is out of service. This represents a very high cost to the operator of the reactor and a more rapid but simple and reliable inspection method is needed.

It is also known in the art to provide a method and apparatus for inspecting nuclear fuel rods in a much more rapid and inexpensive but highly reliable manner. This method consists essentially in causing a change in the relative pressures of the fluid within the fuel rods and the water in which they are immersed such that the internal pressure within the rods becomes higher than the external water pressure. If any defect such as a crack or pinhole exists in any of the fuel rods, the result is the expulsion of a bubble or bubbles of fluid or other material from the interior of the fuel rod into the liquid. Sensing means are provided to detect the emission of such bubbles to provide a reliable and instantaneous indication of the presence of the defect and also of the defect. This provides a very sensitive and reliable method of inspection, but it is adsorbed by the fuel pellets, particularly at the top of the rod, and in some cases such trapped fluid is not expelled and defects in the upper part of the rod may not be detected.

As disclosed in my U.S. Pat. No. 4,039,376, an assembly of fuel rods is first tested by changing the relative pressure that is produced such that fluid within the rod is expelled into the surrounding water through any defect that may exist and the emission of bubbles or other material so expelled is detected. The change in relative pressure is accomplished by blocking the flow of cooling liquid so that the fluid in the rod is heated to increase its pressure, or pressurizing the fuel assembly and then releasing the external pressure to reduce the pressure relative to the internal pressure of the fluid within the rod, or by raising the fuel rod assembly in the liquid in which it is immersed to a higher level where the external pressure is lower. The fuel rods or the complete assembly of rods are vibrated by means of any suitable type of vibrator, and this vibration effectively drives out or expels fluid trapped in the upper part of the fuel rod through any defects which may exist there even though such fluid could not have been expelled by the change in pressure. This additional step, therefore, provides an effective and sensitive means for detecting the existence of defects, especially in the upper part of the rod, which were not necessarily detected by the previous method.

These known fuel rod testing procedures notwithstanding improvements that have been made still require considerable time and additional equipment for the testing procedure. More recently, the task of finding and removing failed fuel assemblies from the reactor has become a top priority for nuclear utilities. Fission products leaking from failed fuel assemblies can cause many conditions that increase operating costs. These conditions include (1) high radiation readings in the primary coolant system; (2) increased volume of liquid radioactive waste; (3) increased volume of solid radioactive waste due to more frequent demineralizer bed replacement; (4) increased costs for disposal of spent fuel assemblies due to special handling and additional decontamination; and (5) increased exposure to personnel. Currently fuel assemblies are tested using fuel "sipping" and/or Ultrasonic Testing (UT) techniques. Fuel sipping detects the release of fission product gases from a failed rod(s) within a fuel assembly. Sipping is performed either in the mast of the refueling machine or in a closed container in the spent fuel pool. UT detects the presence of water inside the fuel cladding of a particular fuel rod(s) within an assembly. UT generally is performed in the spent fuel pool. Sipping requires 2 to 5 minutes per assembly to sample and test for fission products plus an additional 5 to 60 minutes to purge the system whenever a leaking assembly is detected. UT requires 10–15 minutes per assembly for handling and scanning. Although the time requirements for sipping and UT for a single assembly do not seem significant, the time for testing an entire core is approximately two days. With increasing pressure to decrease outage durations, the nuclear industry would benefit immensely from a leak detection system that would reduce the time required to locate leaking assemblies and fuel rods. An effective means of identifying potential leaking assemblies as they are removed from the core, and one that is not dependent upon fission product detection would eliminate the time required for sampling and purging. It would also reduce substantially the time required for UT by pre-screening the assemblies thereby reducing the number to be ultrasonically scanned to a small fraction of the total.

Accordingly, it is an object of the present invention to provide a fuel assembly acoustic system tester for detecting vibrations emitted from leaking fuel assemblies as they are removed from the core assembly of a nuclear reactor.

It is a further object of the present invention to detect vibrations emitted from leaking fuel assemblies during upward motions of the fuel assembly being removed from a core of a nuclear reactor together with decreases to the external hydraulic pressure on the fuel rods so as to increase the pressure differential across the fuel rod cladding whereby if a leak is present the differential pressure causes the expulsion of internal fuel rod fluid, gas or liquid, through the leak.

It is another object of the present invention to derive an electrical signal within a selected response frequency to establish essentially only mechanical vibrations corresponding to only the passage of a fluid medium through porus sidewall defects in the fuel rod of the fuel assembly during removal from a nuclear reactor core.

SUMMARY OF THE INVENTION

According to the present invention there is provided a method of detecting defects in nuclear fuel rods during refueling of a nuclear reactor. The method included the steps of forming a mechanical interconnection between an accelerometer mounted on a releasable fuel gripper of a refueling machine, displacing the releasable fuel gripper through a water shielding pool into a reactor vessel for gripping engagement with a fuel rod assembly in the reactor core, lifting the fuel rod assembly from the nuclear reactor core to an elevation there above where there always remains a protective layer of at least 30 feet of pool water, the fuel rod assembly being lifted free of mechanical contact with fuel assembly support structure in the reactor core, and obtaining an electrical signal within a selected response frequency from the accelerometer to represent mechanical vibrations corresponding essentially only to the passage of a fluid medium through porus sidewall defects in a fuel rod of the fuel rod assembly induced by the hydrostatic pressure change on the fuel rod assembly during movement by the step of lifting.

According to the present invention there is also provided an apparatus for detecting defects in nuclear fuel rods during refueling of a nuclear reactor, the including the combination of a releasable fuel rod gripper including an accelerometer mounted thereto for movement with a fuel assembly during removal from a nuclear reactor core, means for lifting the accelerometer together with the gripper and a fuel assembly from the nuclear reactor core within a radiation shielding water pool there above, and means for forming an electrical signal within a selected response frequency from the accelerometer corresponding to mechanical vibrations essentially only in response to the passage of a fluid medium through porous sidewall defects in a fuel rod of the fuel rod assembly.

BRIEF DESCRIPTION OF THE DRAWINGS

The present invention will be more fully understood when the following description is read in light of the accompanying drawings in which:

FIG. 1 is an elevational view partly in section of a typical nuclear reactor installation including a refueling machine;

FIG. 2 illustrates six different positions of the refueling machine occurring during a typical refueling operation during which a method and apparatus of the present invention is utilized;

DETAILED DESCRIPTION OF THE DRAWINGS

Figure 3:
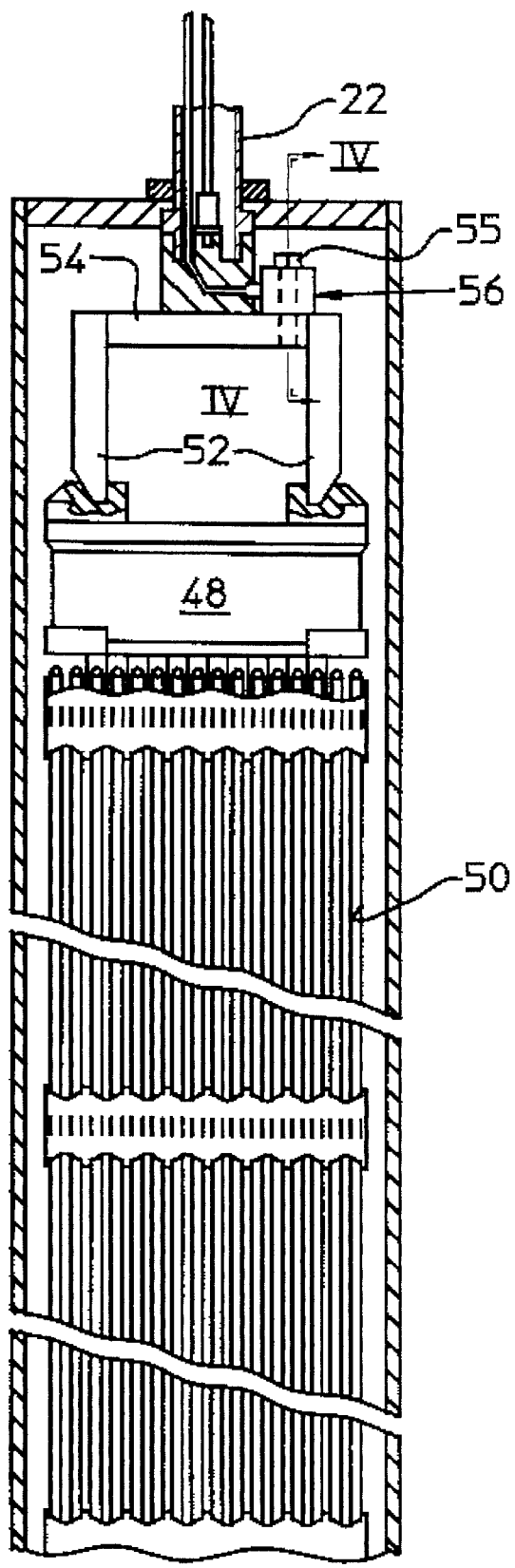
FIG. 3 is a plan view of an accelerometer mounted on a fuel gripper structure of a refueling machine according to the present invention.

In FIG. 1 there is illustrated a nuclear reactor vessel 10 having therein a reactor core 12 forming the operation site for nuclear fuel assemblies 12A of which the top surface is identified by reference numeral 12B. Reference numeral 14 identifies the top of the reactor hub which is situated at an elevation below the floor of transfer cavity identified by reference numeral 16. A fuel container 18 is shown situated in a transfer system for containing fuel assemblies during a refueling operation. A reactor vessel flange 20 surrounds an opening in the reactor vessel through which a gripper mast can pass for engaging and removing fuel assemblies from the reactor core and placing fuel assemblies in the reactor core. The gripper mast 22, per se well known in the art, is supported by a refueling machine 24 which has wheels engaged with rails for movement of the machine horizontally above the reactor. The refueling machine supports spaced apart rails 26 which in turn engage the wheels of a carriage 28 that in turn supports a control console 30 and the gripper mast. A gib crane 32 is supported by frame structure of the refueling machine 24 for various uses when servicing the reactor. The mast assembly shown in FIG. 1 is made up of a hoist 34 mounted on the upper end of a tubular housing 36 which supports first and second masts section 38 and 40 forming mast 22. Mast 40 has an interior constructed to receive a gripper assembly 42 that is connected to the cables of the hoist assembly for movement between the "FULL UP" position shown in FIG. 1 and various other positions shown in FIG. 2 which are labeled "GRIPPER IN MAST"; "ENTERING UPPER SLOW ZONE"; "LEAVING UPPER SLOW ZONE"; "LOWER SLOW ZONE"; AND "FULL DOWN". In the FULL UP position which is shown in both FIGS. 1 and 2 a fuel assembly 44 is positioned wholly within the lower portion of the mast; whereby it is protected for lateral movement from a position overlying a core assembly as shown in FIG. 1 to a position overlying the fuel container 18. Returning again to FIG. 2 the position GRIPPER IN MAST indicates that the cross head portion of the gripper as will be described in greater detail hereinafter resides in the cavity of the mast while gripper pin lugs protrude from the mast and occurs by lowering of the gripper from its FULL UP position. In FIG. 2 the position labeled ENTERING UPPER SLOW ZONE indicates a withdraw of the gripper assembly into the mast as will occur when a fuel assembly is moving into and from the reactor core. This movement of the gripper assembly establishes a spaced relation between the bottom of the fuel assembly and the top of the fuel assembly 12A. The position LEAVING UPPER SLOW ZONE indicates a gripper assembly movement into a position where the lower end of the fuel assembly is spaced a slight distance to reside within the reactor core. the LOWER SLOW ZONE indicates a movement of the gripper head in which the bottom of the fuel assembly is lifted free and clear of the reactor core support plate 46 located in the bottom portion of the reactor core. The position FULL DOWN indicates the location of the gripper assembly wherein gripper arms move into and out of engagement with a fuel assembly resident in the core 12.

Figure 5:
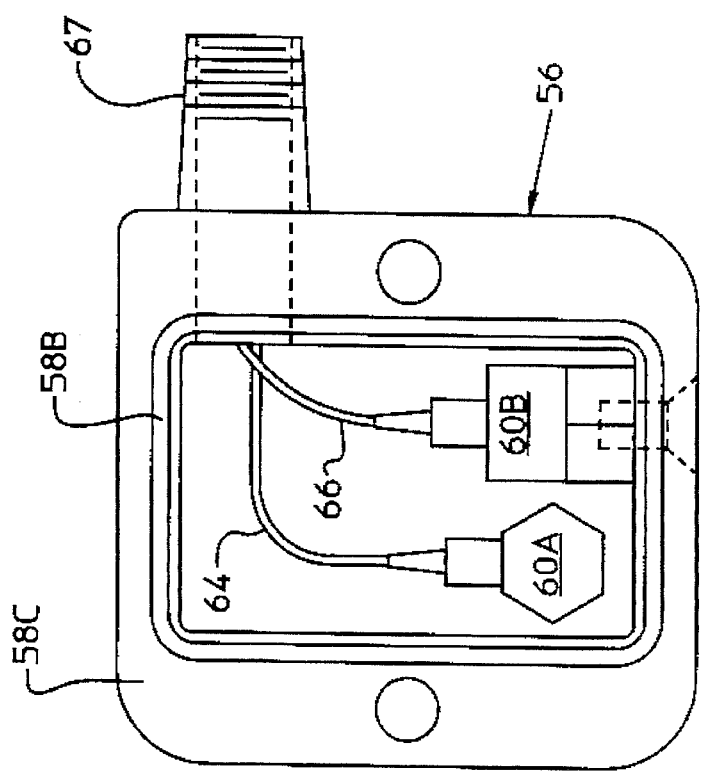
FIG. 5 is a plan view taken along lines V—V of FIG. 4.
Figure 4:
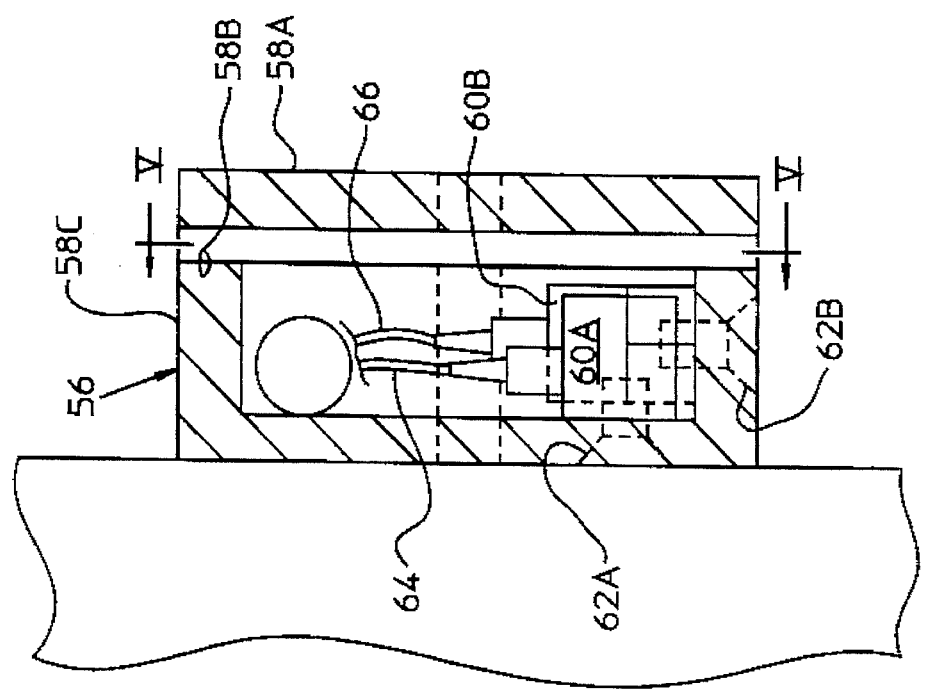
FIG. 4 is a view taken along lines IV—IV of FIG. 3.
Figure 6:
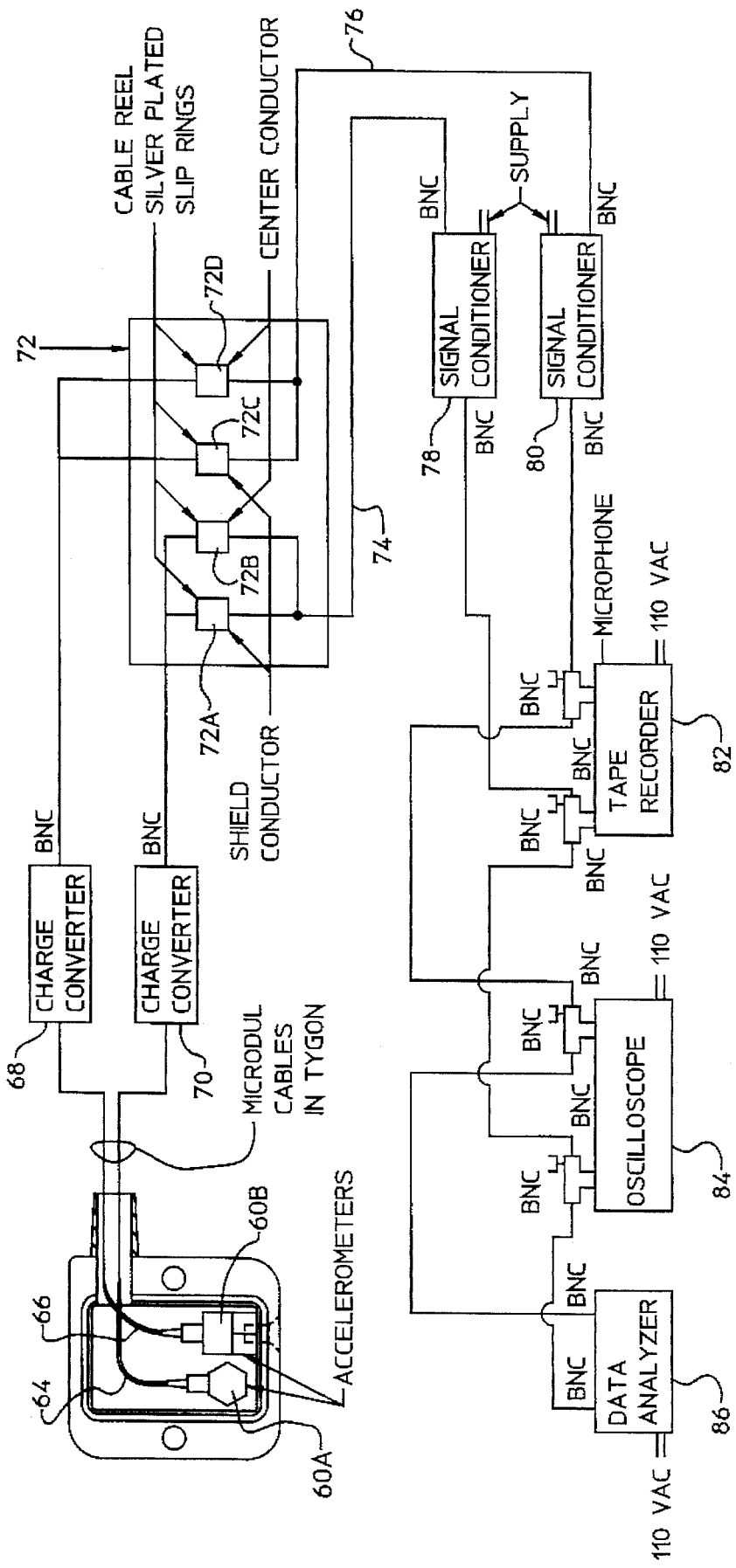
FIG. 6 is a schematic illustration of electrical circuitry for processing electrical signals derived from the accelerometer forming part of the present invention.

In FIGS. 3, 4 and 5 there is illustrated in greater detail the upper portion 48 of the fuel assembly which includes an array of fuel rods 50 supported in a nozzle plate in a manner per se well known in the art. The upper portion 48 includes surfaces which can be releasably engaged by gripper arms 52 forming part of the gripper assembly 42. The gripper arms 52 are supported by a gripper head 54 which is joined by a fixture to the lower end portion of the gripper mast 22. Bolts 55 form a rigid mechanical connection between the gripper head 54 and a hermetically sealed casing assembly 56 having a removable top 58A that is sealed by an O-ring 58B carried on the upper seal face of a thick walled box 58C. The box has an internal cavity wherein there is located two perpendicularly oriented acoustical sensitive accelerometer instruments 60A and 60B with acoustically responsive membranes 62A and 62B in the sidewall and the floor wall, respectively, of the box 58C to impart mechanical motion to a core of a solenoid. The accelerometer instruments 60A and 60B are applied to a co-axial cables 64 and 66, respectively, that extend from the water tight cavity of the casing assembly 56 into a threaded connector 67 joined with a duct that extends upwardly within the mast to the tubular housing 36 where a cable reel, not shown, connects the cables to supply their output signals to electrical circuitry shown schematically in FIG. 6.

The cables 64 and 66 extending from the accelerometer instruments are connected to charge converters 68 and 70 mounted on the cable reel which is schematically illustrated and identified by reference numeral 72. Forming part of the cable reel are slip rings 72A, 72B, 72C and 72D by which the respective output signals from the accelerometer instruments are applied by transmission cables 74 and 76 to signal conditioners 78 and 80, respectively, which are supported on the bridge floor of the refueling machine. The output signals from the respective signal conditioners are applied to input terminals of each of a tape recorder 82, an oscilloscope 84, and a data analyzer 86 which are preferably table mounted in the main containment floor of the reactor building. The tape recorder 82 provides a permanent record of the output signals from the accelerometer instruments during the refueling operation whereas the oscilloscope 84 provides a real time visual display of signal outputs of the accelerometers. The data analyzer 86 serves to identify the occurrence of signals indicative of faulty fuel wall in a fuel assembly during extraction from the reactor for a refueling operation. The sudden pressure drop on the fuel rods as the fuel rod assembly is lifted vertically from the reactor forces fluid to vent from the interior of the rod at the area of the failed cladding. This pressure drop is created on the fuel assembly due to the difference of water pressure between the support site for the fuel assembly in the reactor and an upper limit defined by the required shielding layer of pool water. The perpendicular orientation between the discrete accelerometer instruments gives rise to a response to acoustical waves propagated in the mutually perpendicular responsive planes of the accelerometers. As shown in FIGS. 3–5, the accelerometer 60A has its membrane in a floor wall facing downwardly when supported on the gripper head 54 while accelerometer instrument 60B has its acoustically responsive membrane in a sidewall facing horizontally. The accelerometer instruments thus detect vibrations in different planes and generate corresponding signals in accordance with the frequency of the vibration. The charge converter 68 and 70 convert the signal from the accelerometer instruments which are then amplified by the signal conditioners and recorded on magnetic tape to produce a permanent and retrievable record which can be displayed, if desired, by a printer. For example, the recording can be utilized to review events occurring with any fuel assembly during any refueling and allow the utility to create a trend analysis of assemblies as well as core configuration. Each amplified pulse, when viewed on the analyzer, is a result of an expulsion of fluid from the fuel rod cladding and appears as a high frequency pulse or spike on the incoming signal. The analyzer alerts the operator when a significant change occurs as represented by the high frequency pulse or spike. The method and apparatus of the present invention give rise to the production of the signals which can be analyzed within for an immediate determination as to the existence of a leakage within the given fuel signal. In this way, selected fuel assemblies can be routed for further testing to identify the specific fuel rod or rods where cladding failures occurred.

Figure 7:
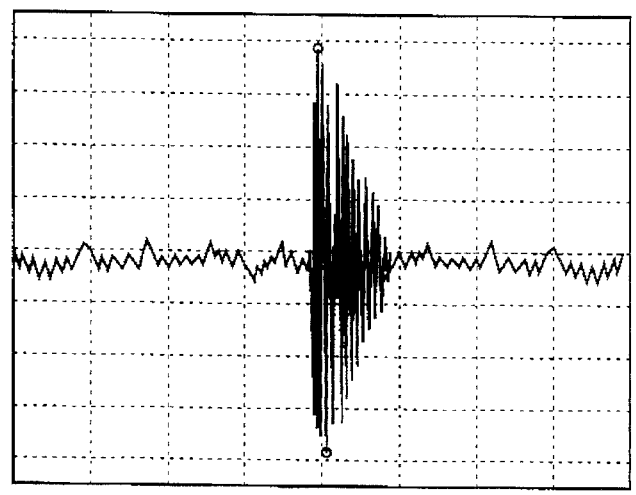
FIGS. 7–9 are oscilloscope traces indicative of displays of mechanical vibrations representing the passage of a fluid medium through porous sidewall defects in a fuel rod.
Figure 8:
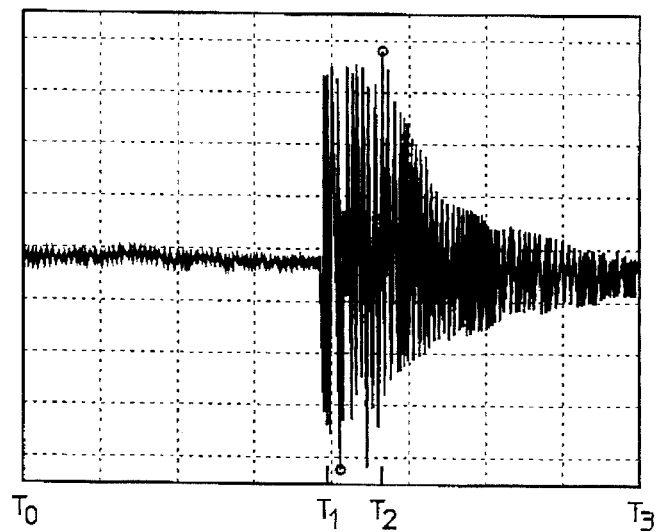
Figure 9:
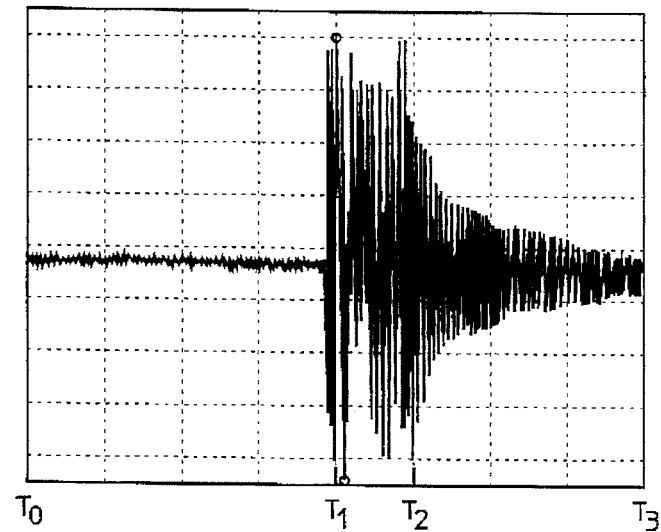

FIGS. 7, 8 and 9 illustrates the voltage spikes displayed by the oscilloscope at a carrier frequency of 10,000 hz. In these displays the X-axis is time while the Y-axis is the voltage of the spikes. In FIG. 7 it will be seen that an initial voltage spike is followed closely by two subsequently occurring voltage spikes of lesser intensity after which the detected signal reduces rapidly to a background noise level. By way of comparison the oscilloscope displays of FIGS. 8 and 9 reveal a sustained period of from T1 to T2 for voltage spikes of large magnitude and thereafter an envelope of detected signals decreases gradually throughout a period between T2 and T3. The noise conditions due to leakage through areas of cladding failures are clearly greater in intensity and duration as depicted by FIGS. 8 and 9 as compared with the detected fuel leakage of FIG. 7. It is to be understood that an oscilloscope trace revealing no fuel rod leakage is represented by the oscilloscope race between T0 and T1.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A method of detecting defects in nuclear fuel rods during refueling of a nuclear reactor, said method including the steps of:

forming a mechanical connection with an accelerometer mounted on a releasable fuel gripper of a refueling machine;

displacing the releasable fuel gripper through a water shielding pool into a reactor vessel for gripping engagement with a fuel assembly in the reactor core;

lifting said fuel assembly from the nuclear reactor core to an elevation there above where there always remains a protective layer of at least 30 feet of pool water, said fuel assembly being lifted free of mechanical contact with fuel assembly support structure in said reactor core; and obtaining an electrical signal within a selected response frequency from said accelerometer to represent mechanical vibrations corresponding essentially only to the passage of a fluid medium through porus sidewall defects in a fuel rod of said fuel rod assembly induced by the hydrostatic pressure change on the nuclear fuel rods during movement by said step of lifting.

2. The method according to claim 1 wherein said selected response frequency is greater than 200 hz and 10,000 hz.

3. The method according to claim 1 wherein said step of forming a mechanical connection includes arranging said accelerometer on said fuel gripper for response to vibrations in two intersecting planes.

4. The method according to claim 3 wherein said intersecting planes intersect at an angle of 90°.

5. The method according to claim 1 wherein said step of lifting said fuel assembly from the nuclear reactor core support plate is used to provide electrical signals while the fuel assembly is at least partially resident in said nuclear reactor core.

6. The method according to claim 1 wherein said step of obtaining an electrical signal includes storing said signal corresponding to said electrical signal on a recoverable storage medium.

7. The method according to claim 6 including the further step of using a computer program to analyze said electrical signal for identifying the presence of defects in said nuclear fuel rods.

8. The method according to claim 6 wherein said recoverable storage medium includes an audio recorder.

9. The method according to claim 1 including the further step of displaying said electrical signal on an oscilloscope; and analyzing the display by said oscilloscope to identify the existence of defects in said nuclear fuel rods.

10. The method according to claim 9 wherein said step of analyzing the display includes processing said electrical signal in a data analyzer.

11. The method according to claim 1 including the further step of using artificial intelligence techniques including a digital analysis to evaluate and discriminate between normal nuclear fuel acoustical signals and failed nuclear fuel acoustical signals.

12. An apparatus for detecting defects in nuclear fuel rods during refueling of a nuclear reactor, said apparatus including the combination of:

a releasable fuel assembly gripper including an accelerometer mounted thereto for movement with a fuel assembly during removal from a nuclear reactor core;

means for lifting said accelerometer together with said gripper and a fuel assembly from the nuclear reactor core within a radiation shielding water pool there above; and means for forming an electrical signal within a selected response frequency from said accelerometer corresponding to mechanical vibrations essentially only in response to the passage of a fluid medium through porous sidewall defects in a fuel rod of said fuel assembly.

13. The apparatus according to claim 12 further including means for recording said electrical signal.

14. The apparatus according to claim 12 further including an oscilloscope responsive to said electrical signal for forming a digital display corresponding thereto.

15. The apparatus according to claim 12 further including data analyzer means responsive to said electrical signal for indicating the existence of porous sidewall defects in nuclear fuel rods.

\* \* \* \* \*